J. DEAN.
NUT LOCK.
APPLICATION FILED MAY 23, 1912.
1,048,811.
Patented Dec. 31, 1912.
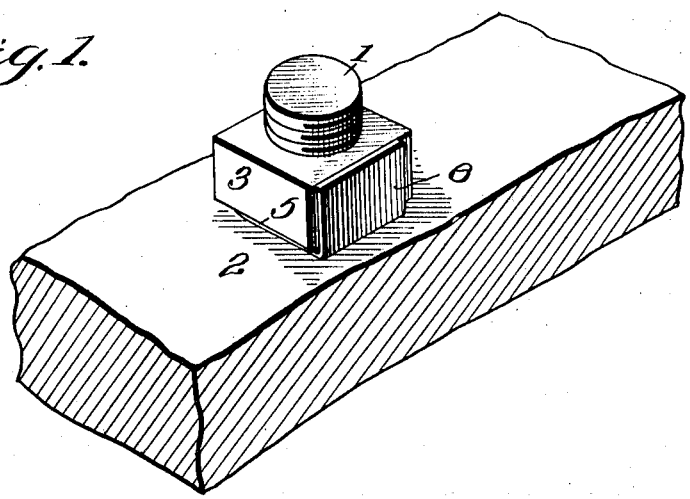
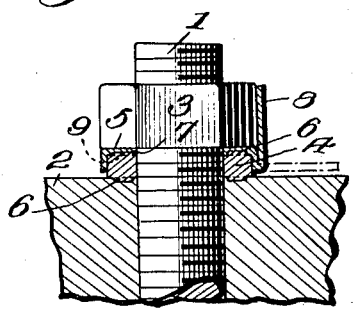
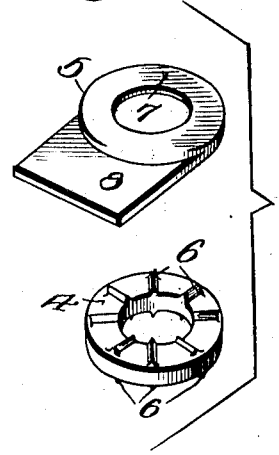
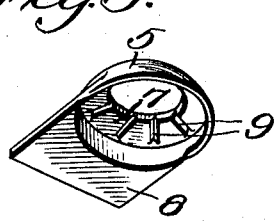
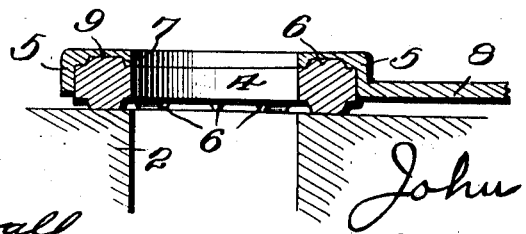

UNITED STATES PATENT OFFICE.

JOHN DEAN, OF RACINE, WISCONSIN.

NUT-LOCK.

1,048,811.  Specification of Letters Patent.  Patented Dec. 31, 1912.

Application filed May 23, 1912. Serial No. 699,269.

*To all whom it may concern:*

Be it known that I, JOHN DEAN, a citizen of the United States, residing at Racine, Racine county, Wisconsin, have invented certain new and useful Improvements in Nut-Locks; and I do hereby declare the following to be a full, clear, and exact description of the invention, such as will enable others skilled in the art to which it appertains to make and use the same.

This invention relates to certain improvements in nut locks; and the objects and nature of the invention will be readily understood by those skilled in the art in the light of the following explanation of the accompanying drawings illustrating what I now believe to be the preferred embodiment from among other formations and arrangements within the spirit and scope of my invention.

An object of the invention is to provide an exceedingly simple, effective, positive, and durable nut lock that can be produced at a comparatively small cost and can be applied to standard nuts and bolts without requiring change in the structure or formation thereof.

A further object of the invention is to provide a simple improved nut locking washer of such peculiar nature as to be capable of taking hold of or biting into the bodies or elements facing or engaging its opposite faces and to thereby hold said washer and said several elements or bodies against independent rotation.

The invention consists in certain novel features in structure, and in arrangements or combinations as more fully and particularly pointed out hereinafter.

Referring to the accompanying drawings:—Figure 1, is a perspective view of a bolt and nut, showing a nut lock in accordance with my invention interposed between said nut and the metal plate, beam or other structure through which said bolt passes, and locking said nut against loosening rotation. Fig. 2, is a sectional view. Fig. 3, is a perspective of the locking washer and the nut receiving washer before application to the bolt and nut and showing them separated from each other. Fig. 4, is a cross sectional view on an enlarged scale showing a portion of the structural element, and the retainer-forming washer and hard metal ring, the biting projections of the ring being shown driven into the material of the retainer and forming depressions therein. Fig. 5, is a detail perspective view of the retainer-forming washer showing the depressions pressed therein by the biting projections of the hard ring.

In the drawings, I show a bolt 1, passed through a metal beam, plate, or other structural element 2, and provided with a nut 3. The element 2, can represent a part of a motor vehicle, although my invention is not so limited, and this element can be composed of wood, metal or any other material receiving a bolt carrying a nut to be locked. In the example illustrated, two nut locking elements are employed, to wit; a very hard material ring, annulus or washer 4, and a relatively-soft or malleable plate, retainer, holder or washer 5. The element 4, is composed of exceedingly hard metal, preferably hard iron, in the trade usually known as "cast hard iron." This hard iron is usually high carbon charcoal iron such as employed in the manufacture of malleable iron and which is very hard before annealing, although I do not wish to so limit all features of my invention.

The element 4, can be in the form of a ring rectangular in cross section, although it can be otherwise formed to attain the functions hereinafter recited. In the example illustrated, the similar opposite side faces of this ring are cast or formed integral with projecting biting projections, edges, or ribs 6, so that both side faces of said element are provided with biting projections or portions, and usually these side faces are similar.

The element 5, is usually struck up from steel or other suitable metal that is relatively soft with respect to the locking element 4. The element 5, forms an annular open-center cup or retainer receiving the ring 4, with its open center alined with the open center of the ring. The cup or retainer is formed with a circumferential portion surrounding the periphery of the ring, and with a flat flange or face 7, receiving one side face of the ring. The cup or retainer leaves the opposite side face of the ring exposed and the depth of the cup is preferably less than the thickness of the ring so that the ring projects from the cup. The cup or retainer is formed integral with a laterally projecting flat lip, flap or flange 8, adapted to be bent outwardly beside the nut, as hereinafter described.

In applying the devices, the ring 4, is slipped onto the bolt with one of its side faces resting against the relatively soft element 2. The retainer is then slipped onto the bolt with its open side toward the element 2, and is placed over the ring 4, so that said ring is encircled by and centered in the cup. The nut is then placed on the bolt and screwed down tightly on the flat outer face of the cup or retainer. Sufficient power or force is applied to the nut to most rigidly tighten the same on the bolt and against the retainer. The act of thus rigidly tightening the bolt drives the biting projections of the hard ring into the element 2, and also into the cup or retainer, thereby forming depressions 9, in the retainer. When the nut has been thus tightened to the desired degree, the lip 8, of the retainer is bent outwardly to a position against the nut to lock and hold the nut against rotation independently of said retainer.

The hard biting projections of the ring maintain a locking biting engagement with the element 2, and the ring is thereby positively held against rotation. The hard biting projections of said ring also maintain a locking biting engagement with the retainer and positively lock and hold said retainer against rotation. The projections of the ring are so hard that the act of tightening up the nut produces pressure causing said teeth or projections to embed or bite into and positively enter or depress the materials of the retainer and element 2, and thereby lock the parts together against independent nut loosening movement.

The material of the ring is so hard as to sometimes be brittle, but by providing the encircling cup or retainer for such ring, the parts thereof will be maintained in operative locking relation by the cup, even though the ring fractures or breaks into several pieces when the nut is tightened up or thereafter.

This nut lock is particularly adapted for use in all kinds of machines subjected to excessive vibration and where bolts are used to secure various metal parts, although the invention is not so limited.

It is evident that various changes, variations and modifications might be resorted to without departing from the spirit and scope of my invention and hence I do not wish to limit myself to the exact disclosure hereof.

What I claim is,—

1. A nut lock consisting of a relatively-soft-metal washer cupped to form a retaining cup having a flat projecting lip, and a hard metal ring in and encircled by said cup and having side face biting projections, substantially as described.

2. A nut lock comprising a non elastic rigid hard metal element having biting projections at opposite sides, and a relatively soft metal retainer composed of a cupped washer receiving said element to hold it against radial displacement and adapted to be engaged by a nut and thereby driven against said element to drive the projections thereof into said washer and into a structural element, said nut lock embodying means to hold the nut against retrograde movement on said washer.

3. A nut lock comprising a hard metal ring having biting projections at both side faces, in combination with a relatively soft metal washer cupped to form a retainer receiving and encircling said ring to maintain the parts of the ring in operative relation in case of fracture of the ring, said washer adapted to be driven against said ring by a nut to force said projections into said washer and into the member against which the ring is forced by said washer, said nut lock embodying means to hold the nut against retrograde movement on said washer.

In testimony whereof I affix my signature in the presence of two witnesses.

JOHN DEAN.

Witnesses:
J. W. KNIGHT,
R. W. VAN ORMME.